June 21, 1938.     G. A. TUCK     2,121,108
HOT AIR FURNACE
Filed March 5, 1937     2 Sheets-Sheet 1
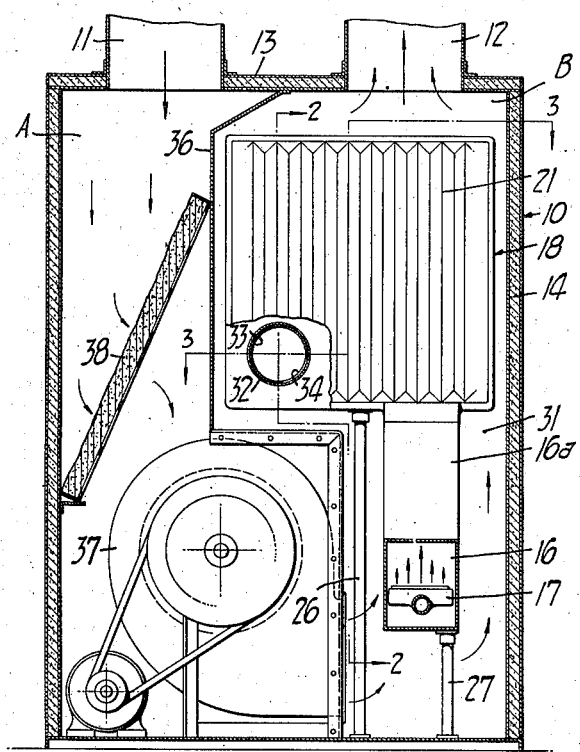
FIG_1_
FIG_4_
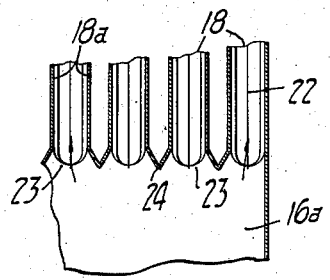
FIG_3_
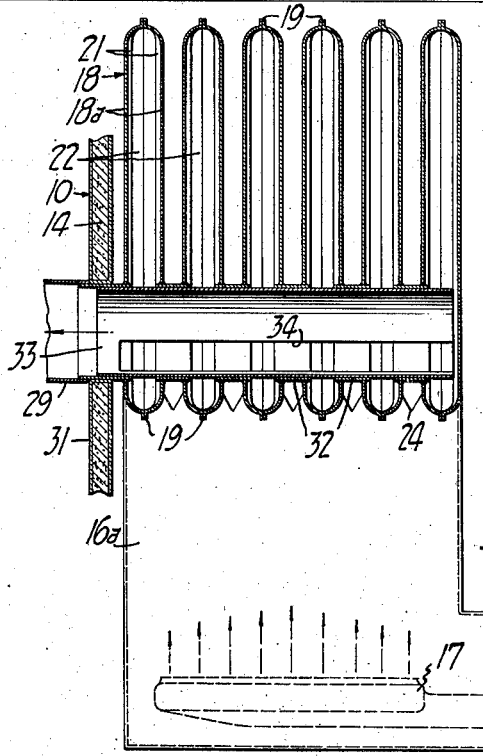
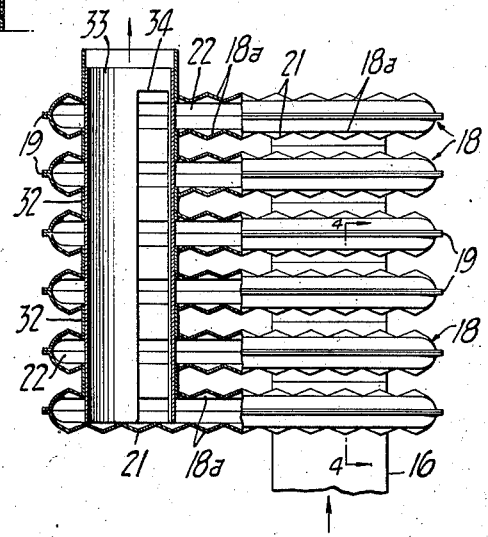
FIG_2_
INVENTOR.
George A. Tuck
BY Paul D. Flehr
ATTORNEY.

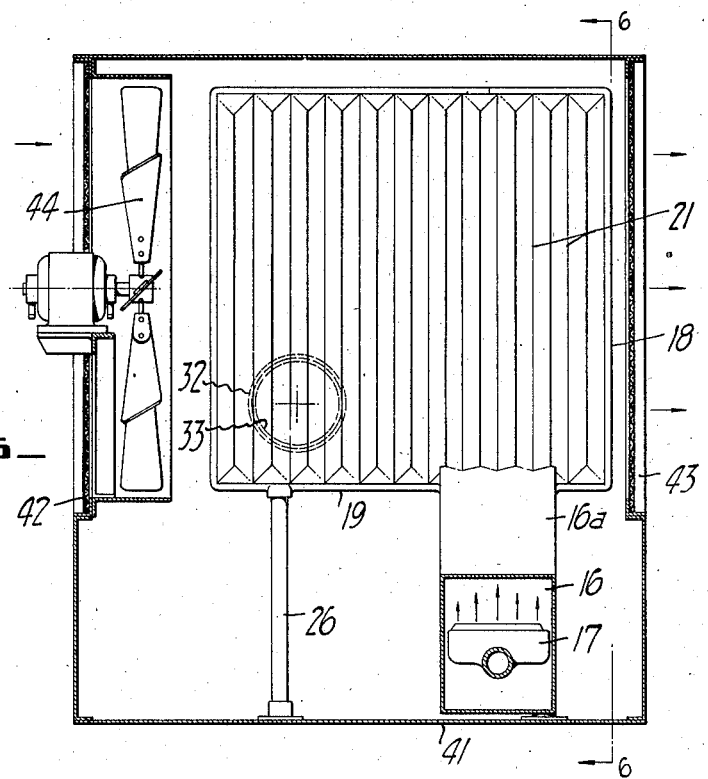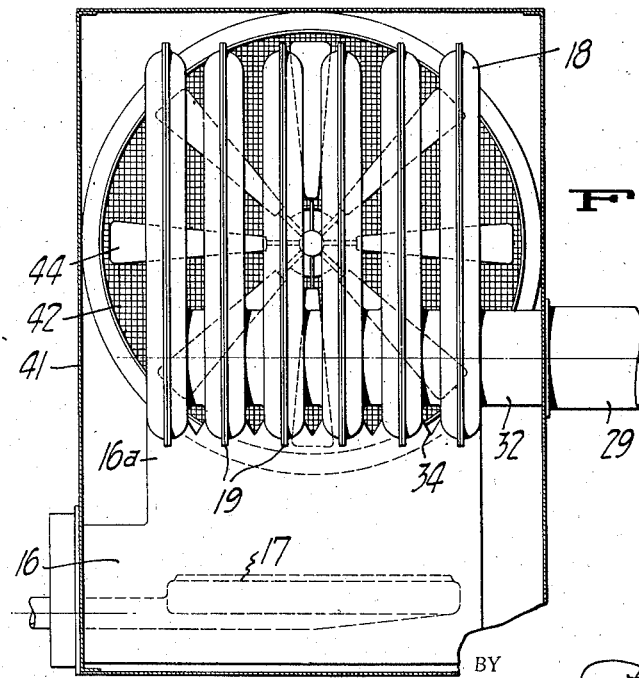

Patented June 21, 1938

2,121,108

UNITED STATES PATENT OFFICE 2,121,108

HOT AIR FURNACE

George A. Tuck, San Francisco, Calif.

Application March 5, 1937, Serial No. 129,219

4 Claims. (Cl. 126—99)

This invention relates generally to hot air furnaces such as are adapted for domestic heating purposes.

It is an object of the invention to provide a compact furnace of the above character, making use of a series or group of heat transfer sections, and having simple means to secure balanced flow of hot products of combustion through the various sections.

Another object of the invention is to provide a hot air heating furnace capable of relatively high capacity for a given area of heat transferring surface, which will afford relatively high thermal efficiency.

Another object of the invention is to provide relatively simple and compact heating equipment incorporating a blower for forced draft operation, and also an air filter.

Further objects of the invention will appear from the following description in which the preferred embodiment of the invention has been set forth in detail in conjunction with the accompanying drawings.

Referring to the drawings:

Fig. 1 is a side elevational view, in cross section, illustrating a furnace incorporating the present invention.

Fig. 2 is a cross sectional detail taken along the line 2—2 of Fig. 1.

Fig. 3 is a cross sectional detail taken along the line 3—3 of Fig. 1.

Fig. 4 is a cross sectional detail taken along the line 4—4 of Fig. 3.

Fig. 5 is a side elevational view in cross section, showing a modified furnace construction incorporating the present invention.

Fig. 6 is a cross sectional view, taken along the line 6—6 of Fig. 5.

My furnace is of the type making use of a plurality of heat transfer sections formed of metal walls, and through which hot products of combustion are caused to flow from a suitable combustion chamber. Communication between the various heat transfer sections and the flue is established through novel means, which insures a proper balanced or controlled flow of products of combustion.

The furnace as illustrated in the drawings consists of a housing or casing 10, which is provided with a cold air inlet 11, and one or more hot air outlets 12. In this instance such openings are shown extending through the housing top 13. The housing itself can be of more or less conventional construction, consisting for example of inner and outer sheet metal walls separated by suitable heat insulating material 14.

Disposed within the lower portion of the housing and preferably to one side, as shown in Fig. 1, there is a combustion chamber 16. While it is apparent that the source of fuel may vary, a representative burner 17 of the gas type has been illustrated. Above the combustion chamber 16 are the heat transfer sections 18. These sections may likewise vary with respect to mechanical detail, but in the design illustrated each consists of spaced formed metal side walls 18a, having their edges welded or otherwise suitably joined together as indicated at 19. In order to effectively increase the heat transfer area, the side walls 18a of the sections can be provided with corrugations, as indicated at 21.

The interior passages 22 formed by the walls 18a, are in communication with the combustion chamber 16. Thus the combustion chamber 16 is provided with a vertical extension 16a which connects with the lower corresponding edges of the heat transfer sections 18. This communication can best be understood by reference to Fig. 4, from which it will be evident that openings 23 and the lower edges of the heat transfer sections are in free communication with the interior of combustion chamber 16, while at the same time a weld connection 24 or like form of junction between the side walls of the sections, establishes a seal with respect to the spaces surrounding the sections and the combustion chamber. It will be evident that with a suitable rigid connection between the walls of the combustion chamber and the walls of the heat transfer sections 18, these portions will become one rigid unit, which can be supported within the housing 10 by suitable means, such as the uprights 26 and 27.

In many instances it is desirable to establish a flue connection to the back side of the furnace housing, leaving the other two sides of the housing substantially unobstructed. Thus in the present instance a flue pipe 29 is shown connecting through the back wall 31 of the housing. Communication between such flue pipe, and the interiors of each of the heat transfer sections 18, is established as follows:— The adjacent side walls of each of the sections are provided with aligned openings, which are coupled together by the aligned short pipe sections 32. These openings should be located with due regard to the points of communication between the interiors of the sections and the combustion chamber. Thus in the arrangement shown in the drawings, the pipe sections 32 are located near one lower corner of the pipe sections while the parts in communication between the heat transfer sections and the combustion chamber are offset towards the other lower corners of the sections. While this arrangement is to be preferred, it is evident that different locations might be utilized, as for example, the pipe sections might be located near the upper left hand corners of the heat transfer sections, as viewed in Fig. 1. Telescopically fitted within the pipe sections 32, there is a pipe 33, which is provided with a properly dimensioned longitudinal slot 34. As will be evident from both Figs. 2 and 3, slot 34 establishes communication between the interior of pipe 33, and the interiors of all of the heat transfer sections 18. Pipe 33 is removable, to enable its replacement with a pipe having a differently dimensioned slot 34, or to enable replacement in the event of damage due to excessive heating.

To complete the furnace illustrated, the interior of the housing 10 is shown provided with a partition 36, which divides the interior of the housing into two portions A and B. It is portion B which is occupied by the heat transfer sections 18, and the combustion chamber 16. The lower part of portion A is occupied by a suitable blower 37, the inlet of which communicates with the space formed by portion A, and the outlet of which communicates with the lower part of portion B. Above the blower 37 there is a suitable air filter unit 38, which can be disposed in an inclined position in order to conserve space.

Operation of the furnace described will be apparent from the foregoing. Blower 37 draws cold air into the housing from the inlet 11, through the filter unit 38, to be discharged into the lower part of the housing portion B. This air is heated in passing upwardly around the combustion chamber 16, and is further heated by passing around and between the heat transfer sections 18. Hot products of combustion from the combustion chamber 16 flow upwardly into the interiors of the heat transfer sections 18, and ultimately flow through the slot 34 in pipe 33, to be finally delivered to the flue 29. Irrespective of the rate of flow of products of combustion, equalized and controlled flow can be maintained through the various sections, due to the action of the restricted slot 34.

It will be evident that various structural details can be altered within the scope of the invention. Thus in the modification of Figs. 5 and 6 the invention is embodied in a compact apparatus of the "unit heater" type. The housing 41 of this heater or furnace has a cold air inlet 42 and a hot air outlet 43. The heat transfer sections or elements 18 are mounted within this housing, between the inlet and outlet openings, and are connected to the combustion chamber 16 in the same manner as described for the furnace of Figs. 1 to 4 inclusive. A blower or fan 44 forces a draft of air through the housing and between the sections 18. Connection to the flue pipe 29, in order to secure an even pull upon each of the sections or elements 18, is substantially the same as shown in Figs. 1 to 4 inclusive. Thus the sections 18 are connected by the pipe sections 32, and the slotted pipe 33 controls flow of products of combustion from each of the heat transfer elements to the flue.

I claim:

1. In a hot air heating furnace, a housing having a cold air inlet and a hot air outlet, a combustion chamber formed of metal walls and disposed within the housing, a series of heat transfer sections disposed in spaced side-by-side relationship within said housing, each of said sections being formed of spaced metal side walls defining an inner space for flow of hot gaseous products of combustion, means forming communicating connections between corresponding edges of said sections and said combustion chamber, the adjacent side walls of said sections being provided with aligned openings, aligned pipe sections serving to couple together the openings of adjacent sections, a flue pipe connection to one end section of the series, and a single slotted member disposed within said pipe sections, said member affording flow restricting communication between said flue pipe and each of said heat transfer sections.

2. In a hot air heating furnace, a housing having a cold air inlet and a hot air outlet, a combustion chamber formed of metal walls and disposed within the housing, a series of heat transfer sections disposed in spaced side-by-side relationship within said housing, each of said sections being formed of spaced side walls defining an inner space for flow of hot gaseous products of combustion, means forming communicating connections between corresponding edges of said sections and said combustion chamber, the side walls of each of said sections being provided with aligned openings, aligned pipe sections serving to couple together the openings of adjacent sections, a flue pipe connection to the opening of one end section of the series, and a single slotted member disposed within said pipe sections, said member affording flow restricting communication between said flue pipe and each of said heat transfer sections.

3. In a hot air heating furnace, a housing having a cold air inlet and a hot air outlet, a combustion chamber formed of metal walls and disposed within the housing, a series of heat transfer sections disposed in spaced side-by-side relationship within said housing, each of said sections being formed of spaced side walls defining an inner space for flow of hot gaseous products of combustion, means forming communicating connections between corresponding edges of said sections and said combustion chamber, the side walls of each of said sections being provided with aligned openings, aligned pipe sections serving to couple together the openings of adjacent sections, a flue pipe connection to the opening of one end section of the series, and a single member disposed within said pipe sections, said member affording flow restricting communication between said flue pipe and each of said heat transfer sections and means for controlling flow of hot products of combustion from each of said heat transfer sections to said flue pipe, said means comprising a pipe telescopically fitted within said pipe sections, said pipe being provided with a longitudinal slot serving to establish communication between said flue pipe and the interiors of all of said sections.

4. In a hot air furnace, a housing having a cold air inlet and a hot air outlet, a combustion chamber formed of metal walls and disposed within the lower portion of the housing, a series of relatively flat heat transfer sections disposed in spaced upright side-by-side relationship, each of said sections being formed of substantially parallel spaced side walls defining an inner space for flow of hot gaseous products of combustion, means serving to establish communication between corresponding lower edges of said sections and said combustion chamber, the side walls of each of said sections being provided with openings near the upper edges of the same, said openings being aligned with respect to a substantially horizontal axis, relatively short pipe sections serving to couple together the openings of adjacent sections, a flue pipe extending in a horizontal direction and connecting to the opening of one end section of the series, and a pipe telescopically fitted within said pipe sections and serving to establish restricted communication between the inner spaces of each of said sections and said flue pipe.

GEORGE A. TUCK.